US010645331B1

(12) United States Patent
Li et al.

(10) Patent No.: US 10,645,331 B1
(45) Date of Patent: May 5, 2020

(54) IMMERSIVE VIDEO EXPERIENCE

(71) Applicant: Loop Now Technologies, Inc., Redwood City, CA (US)

(72) Inventors: Wuhsi Li, Somerville, MA (US); Vicent Yang, Redwood City, CA (US); Jerry Luk, Menlo Park, CA (US); Cory Grenier, Marina del Ray, CA (US); June Kim, Redwood City, CA (US); Ethan Fan, San Jose, CA (US); Lucas Alves, Rio de Janeiro (BR); Ben Hansen, Emerald Hills, CA (US); Chen Li, San Jose, CA (US); Shawn Samra, San Francisco, CA (US)

(73) Assignee: Loop Now Technologies, Inc., Redwood City, CA (US)

( * ) Notice: Subject to any disclaimer, the term of this patent is extended or adjusted under 35 U.S.C. 154(b) by 0 days.

(21) Appl. No.: 16/423,332

(22) Filed: May 28, 2019

Related U.S. Application Data

(60) Provisional application No. 62/801,987, filed on Feb. 6, 2019.

(51) Int. Cl.
   *H04N 13/349* (2018.01)
   *H04N 5/44* (2011.01)
(52) U.S. Cl.
   CPC ......... *H04N 5/4403* (2013.01); *H04N 13/349* (2018.05)

(58) Field of Classification Search
   CPC ..................... H04N 13/167; H04N 13/117
   USPC ................................. 348/36–39, 142–160
   See application file for complete search history.

(56) References Cited

U.S. PATENT DOCUMENTS

2018/0288396 A1* 10/2018 Bouazizi .............. H04N 13/183

* cited by examiner

*Primary Examiner* — Anand S Rao
(74) *Attorney, Agent, or Firm* — Adams Intellex, PLC

(57) ABSTRACT

The video playback technology disclosed herein gives fullscreen immersive experience to users when they watch videos on mobile devices used to watch the video. Specifically, an implementation of the technology disclosed herein gives a continuous all-time immersive experience by treating the screen of the mobile device as a window to watch a wide-angle video, and by keeping the video's relative angle to gravity unchanged while users rotate or tilt their mobile devices. In one implementation, the video also zooms in/out of the display during rotation of the smartphones, to give users a sense of getting closer/farther to the video. One or more implementations disclosed herein use inputs from gravity sensors including magnetic sensors, gyroscope, accelerometer, etc., to determine the amount of zooming in/out and shifting for the video in response to various movements, such as rotate, move, and tilt, of the video display device by the users.

20 Claims, 19 Drawing Sheets

IMMERSIVE VIDEO EXPERIENCE

CROSS-REFERENCE TO RELATED APPLICATIONS

This application is a non-provisional application of and claims benefit of U.S. Provisional Application Ser. No. 62/801,987 entitled "immersive video EXPERIENCE" and filed on Feb. 6, 2019 which is incorporated herein by reference in its entirety.

FIELD

Implementations disclosed herein relate, in general, to mobile device technology and specifically to video capture and display for mobile devices.

SUMMARY

The video playback technology disclosed herein gives fullscreen immersive experience to users when they watch videos on mobile devices used to watch the video. Specifically, an implementation of the technology disclosed herein gives a continuous all-time immersive experience by treating the screen of the mobile device as a window to watch a wide-angle video, and by keeping the video's relative angle to gravity unchanged while users rotate or tilt their mobile devices. In one implementation, the video also zooms in/out of the display during rotation of the smartphones, to give users a sense of getting closer/farther to the video. One or more implementations disclosed herein use inputs from gravity sensors including magnetic sensors, gyroscope, accelerometer, etc., to determine the amount of zooming in/out and shifting for the video in response to various movements, such as rotate, move, and tilt, of the video display device by the users.

Implementations disclosed herein allows users to view videos with no constraints as to which orientation the video is taken and which orientation to watch it. Specifically, for any video—whether taken as landscape or portrait—the video playback technology disclosed herein allows the viewer to watch it on a viewing device in portrait or landscape mode or any angle in between. As in most cases users do not watch the video in inverted or upside down view, implementations disclosed herein allows keeping the video in same orientation as the user changes the view angle by rotating or moving the device on which the video is displayed.

The video playback technology disclosed herein allows a video to be taken as portrait or landscape, where the user is allowed to rotate, move, and tilt the mobile device. Specifically, a tilt of the display device is when an angle, between a display device's surface and an imaginary surface vertical to the surface of the earth, exceeds a designated threshold. FIG. 17 illustrates an example move 1700 of the display device is when an angle between a display device's surface and an imaginary surface vertical to the surface of the earth is changed. Compared to that rotating 1800 the mobile device may result in a change in the angle between the surface of the mobile device and directional line on the surface of the earth as illustrated in FIG. 18.

Moreover, in order to enhance the immersive-ness, while the video display maintains a fixed video orientation as the user rotates, moves, and tilts, the video playback technology disclosed herein further applies a scale change (zoom in closer/zoom out farther away) to either focus on partial of view or widen the view area. In one implementation, the video playback technology also shifts the view area in response to user interaction or automatically (by a computer-vision enabled system). As a result, the user is able to have an immersive video viewing experience, which is referred to "Frameless", as the viewing experience is no longer constrained by a video frame. In addition, the viewing system disclosed herein is designed for videos taken by general mobile devices, viewing on general mobile devices. Neither spherical/panorama videos and VR display devices is required.

BRIEF DESCRIPTION OF THE FIGURES

A further understanding of the nature and advantages of the present technology may be realized by reference to the figures, which are described in the remaining portion of the specification. In the figures, like reference numerals are used throughout several figures to refer to similar components.

DETAILED DESCRIPTION

While conventional video viewing is simply staring at the mobile device displaying the video, the technology disclosed herein allows to transform video viewing into an interactive and participatory experience. The approach disclosed herein provides the users an immersive viewing experience irrespective of how the video is recorded and/or enable the viewer to rotate, move, and tilt the mobile device used to view the video while watching the video. As a result, such immersive viewing experience is no longer exclusive to videos recorded using panorama/spherical videos or viewed using VR (virtual reality) devices.

Figure 1:
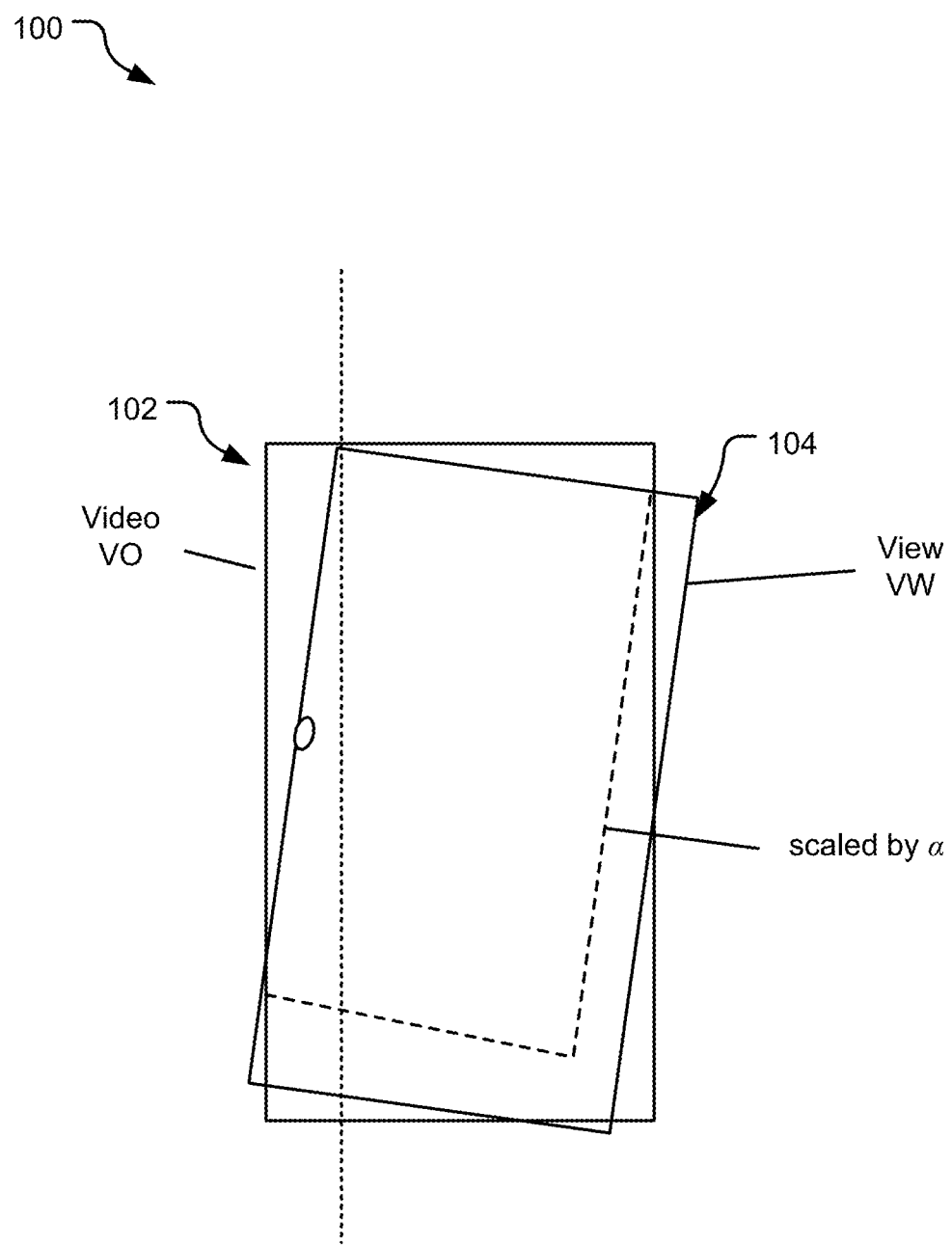
FIG. 1 illustrates an example configuration of a viewing system disclosed herein as transformed into a geometric problem.
Figure 2:
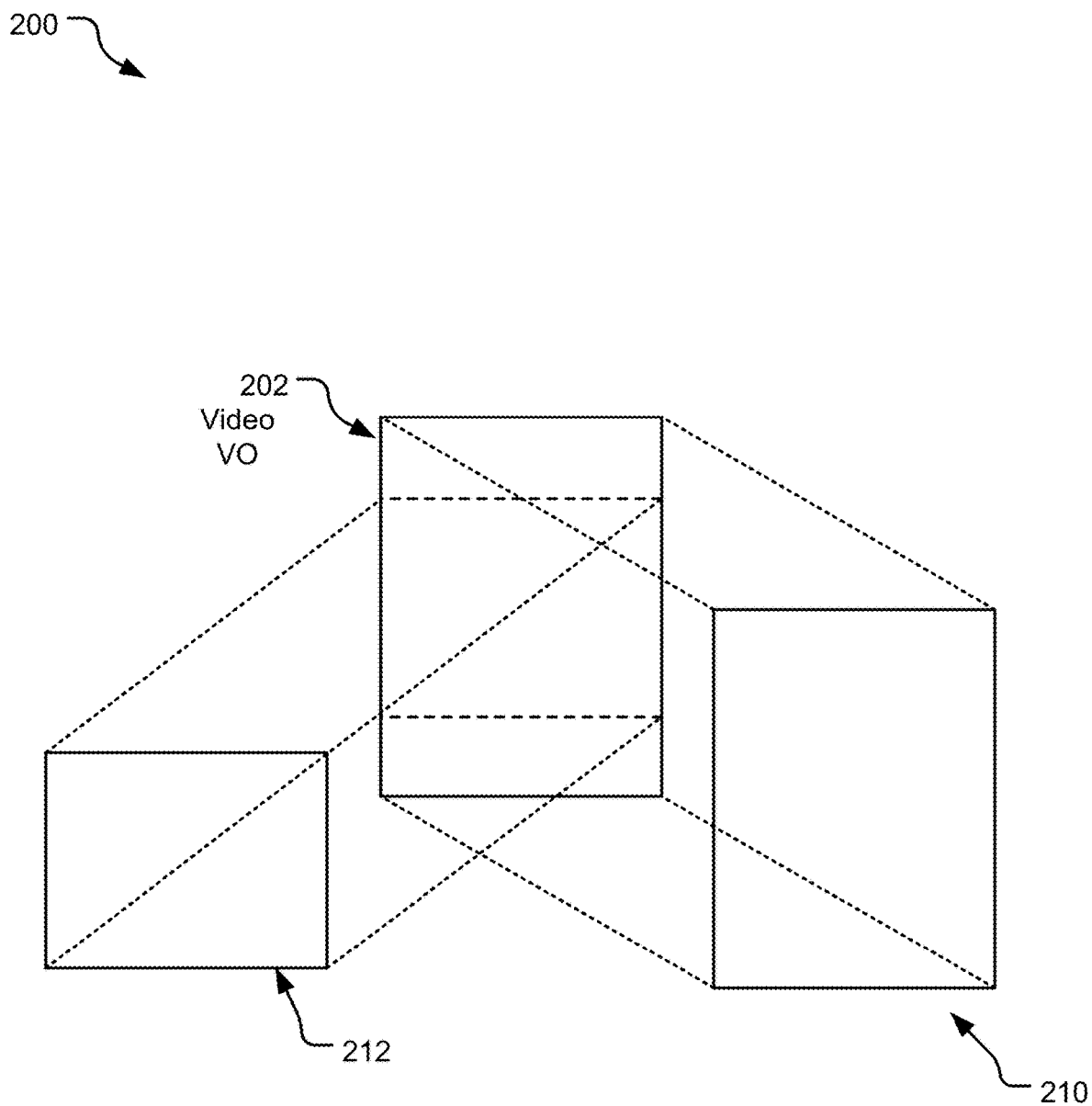
FIG. 2 illustrates an example viewpoint with the viewport in landscape and portrait modes.

The video playback technology disclosed herein provides an immersive video viewing experience for videos recorded by generic mobile devices and delivers a smooth video rendering even when the viewer is rotating, moving, and tilting the viewing device as part of the interaction. Specifically, a good/smooth viewing experience may be defined where:

(a) The video stays in bound: the user cannot see outside the video, which results in an undesirable partial black screen
(b) The user can zoom in only when necessary: to enable the user to view as much part of the video as possible
(c) A stable view: to avoid dramatic movement or scaling on rotating or tilting
(d) A smart view: when only a partial view of the video is visible, show the significant part if possible
(e) Video quality is ensured in every angle To provide the immersive experience, a geometric-based system is designed in order to achieve one or more of the above results. An implementation of the video playback technology disclosed herein obtains various parameters of the video including the following:

(1) Size of video (width and height, defined in pixels)
(2) Size of viewport (width and height, defined in pixels)
(3) $\theta$, the rotating angle of viewport (*will consider user tiling and moving later)
(4) $\alpha$, the scale factor The configuration of the viewing system may be transformed into a geometric problem as illustrated by 100 in FIG. 1, where the video is represented by a rectangle VO 102, and the view is another rectangle VW 104. The rectangle VW will be rotated by $\theta$, and scaled by $\alpha$, and placed into VO as disclosed in FIG. 1. Assuming that the video and view are both standard portrait with 720p (720×1280), the system disclosed herein considers the following boundary conditions:

FIG. 2 illustrates a viewpoint 200: If the viewport is in upright portrait position 210, no scaling is necessary, and the system may display the original video 202. However, if the viewport is in landscape mode 212, an implementation scales it from (1280×720) to (720×405) in order to fit it in the video. This results in a viewing area of 31.6% of the original video, which means a scale of 77.8% may be required to ensure the viewport staying in bound of the video, as illustrated in FIG. 2.

Zoom Factor: To ensure a smooth viewing experience, it is necessary to avoid dramatic movement or scaling when the viewer rotates the viewport. Assuming that the maximal and minimal scale is obtained by scanning through all angles, the Zoom Factor may be defined as the ratio between maximal scale and minimal scale.

Zoom Factor=Maximal Scale/Minimal Scale

Figure 3:
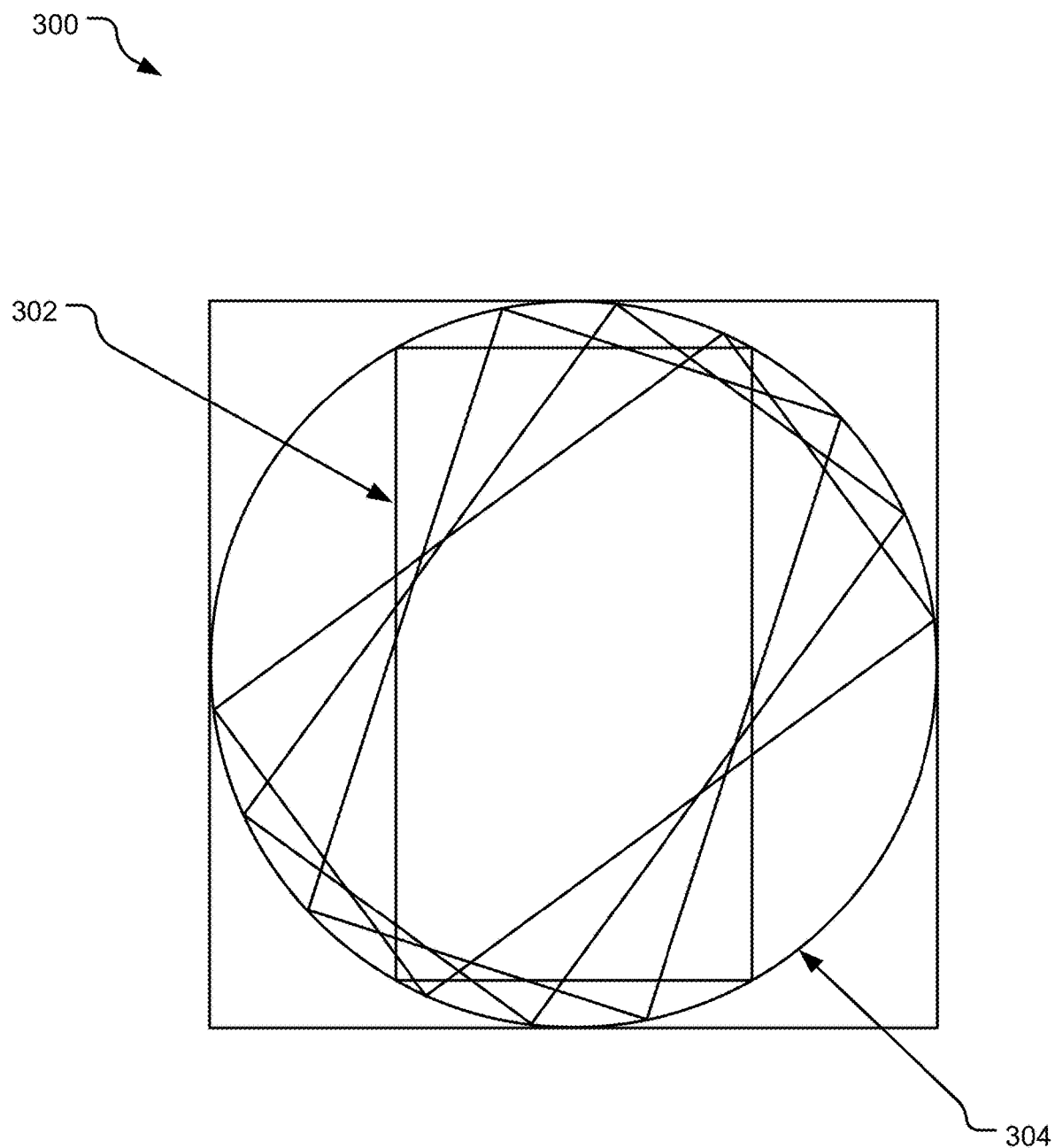
FIG. 3 illustrates an example fixed-orientation video viewing experience by fitting a viewport into an inscribed circle.

FIG. 3 illustrates the fixed-orientation video viewing experience by fitting a viewport 302 into an inscribed circle 304 using circle-based rotation. Here the system considers another boundary condition. Assume that the video rectangle VO is a square, an inscribed circle is created and the view rectangle VW is scaled in order to fit into the circle (becomes an inscribed rectangle to the circle). It can be observed that no scaling is necessary when the system rotates the rectangle within a circle. In other words, the scale is fixed, and the zoom Factor is equal to 1. The above condition states that, when a square video is recorded, the fixed-orientation video viewing experience can be easily achieved by fitting the viewport into an inscribed circle, as illustrated in FIG. 3. In theory, given a non-square video, the system can also trim the video into a square video to leverage the condition. However, since significant parts of the video may be cropped out during the process, trimming the video is not an ideal solution.

Figure 4:
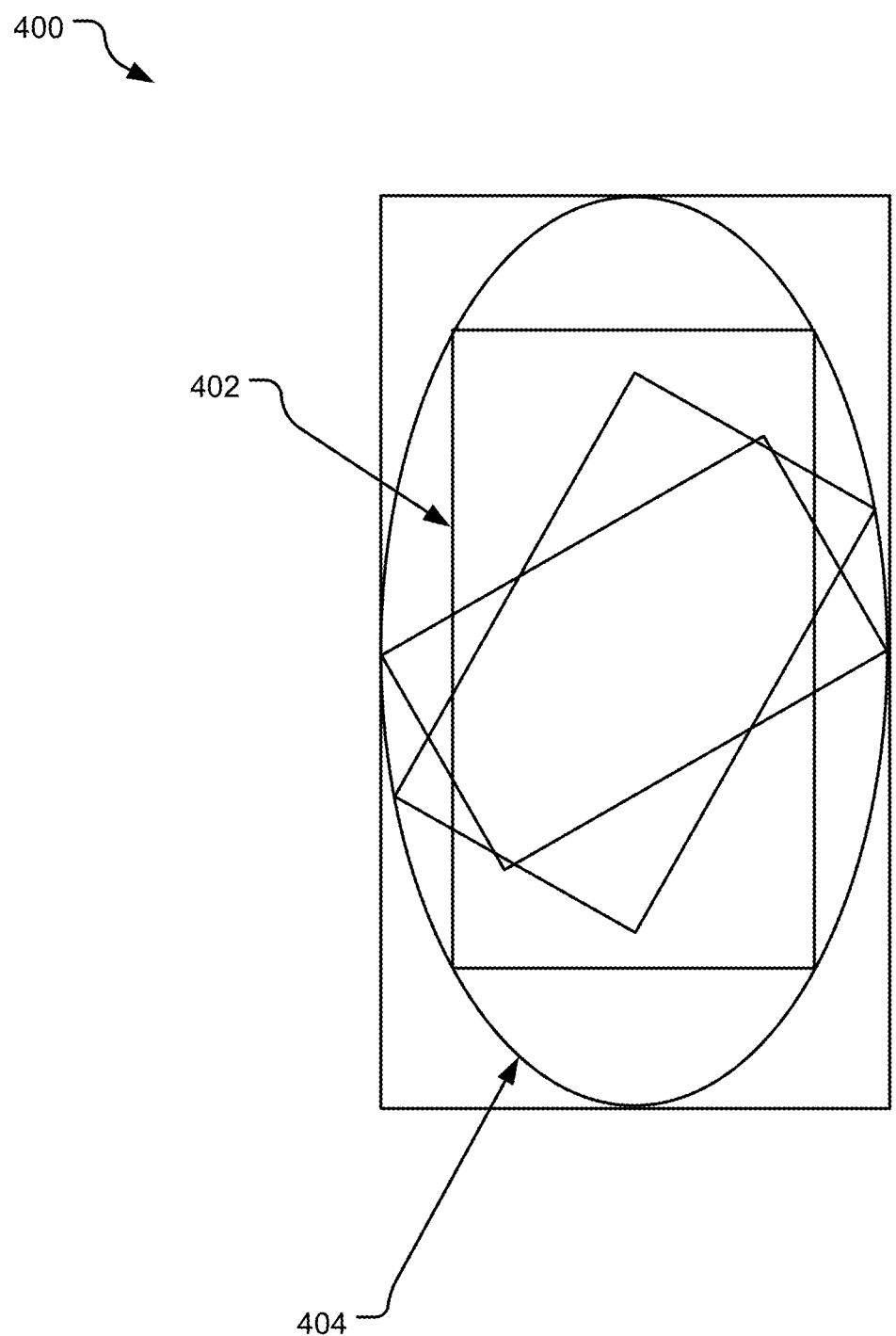
FIG. 4 illustrates an example inscribing of a rectangle sized video to an oval.

FIG. 4 illustrates an example 400 inscribing of a rectangle sized video 402 to an oval 404. In this oval-based rotation, instead of cropping the wide side of the rectangle and rotating on the circle, here an implementation chooses to create the inscribed oval 404 of the video rectangle VO. It may no longer be possible to find an inscribed rectangle to the oval at all angles, since not all vertices can stay on the oval. However, the system can still fit the rectangle sized video 402 on the oval 404, which can be inscribed to the oval 404 in vertical or horizontal orientation as illustrated in FIG. 4, and can have two vertices on the oval 404 on other angles at most.

Alternatively, the playback technology disclosed herein may fit a rectangle video in an oval. Here the playback technology disclosed herein uses an approach described below to find a minimal scale a, given an oval inscribed to video rectangle VO and a view rectangle VW rotated by $\theta$.

Figure 5:
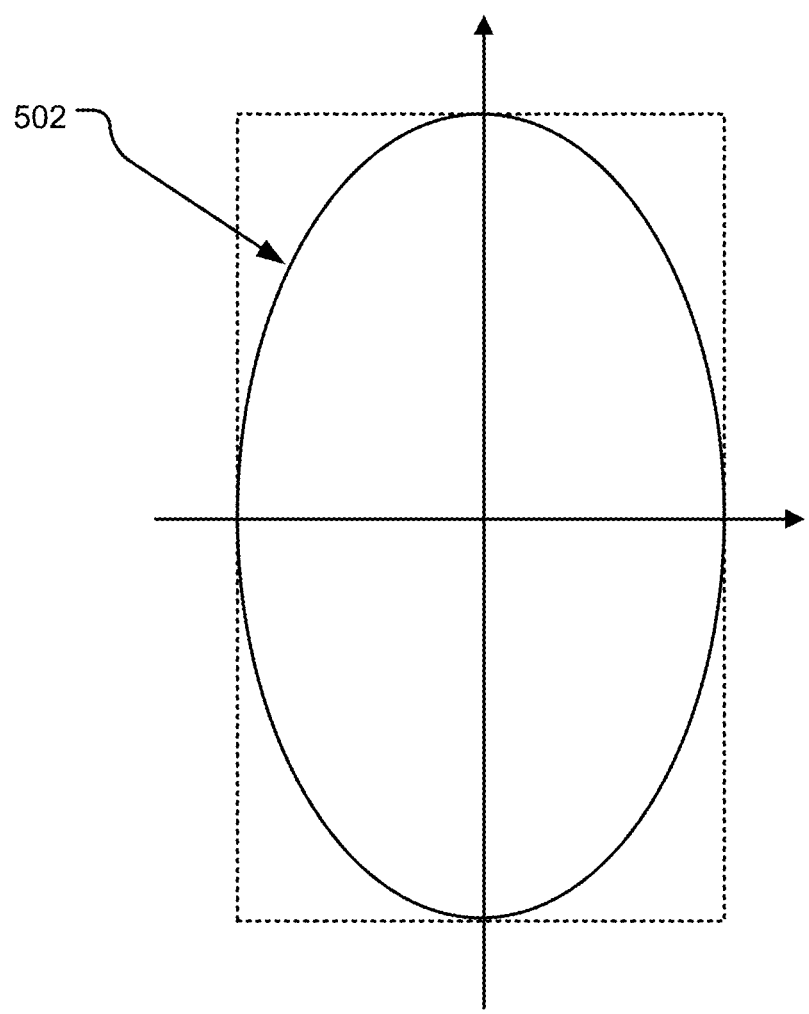
FIG. 5 illustrates an example illustration for fitting a rectangle into an oval.

(1) An equation of an oval 502, as illustrated in FIG. 5, may be given by:

$$\frac{x^2}{a^2} + \frac{y^2}{b^2} = 1$$

Where $a=0.5\times$video width, $b=0.5\times$video height.

Figure 6:
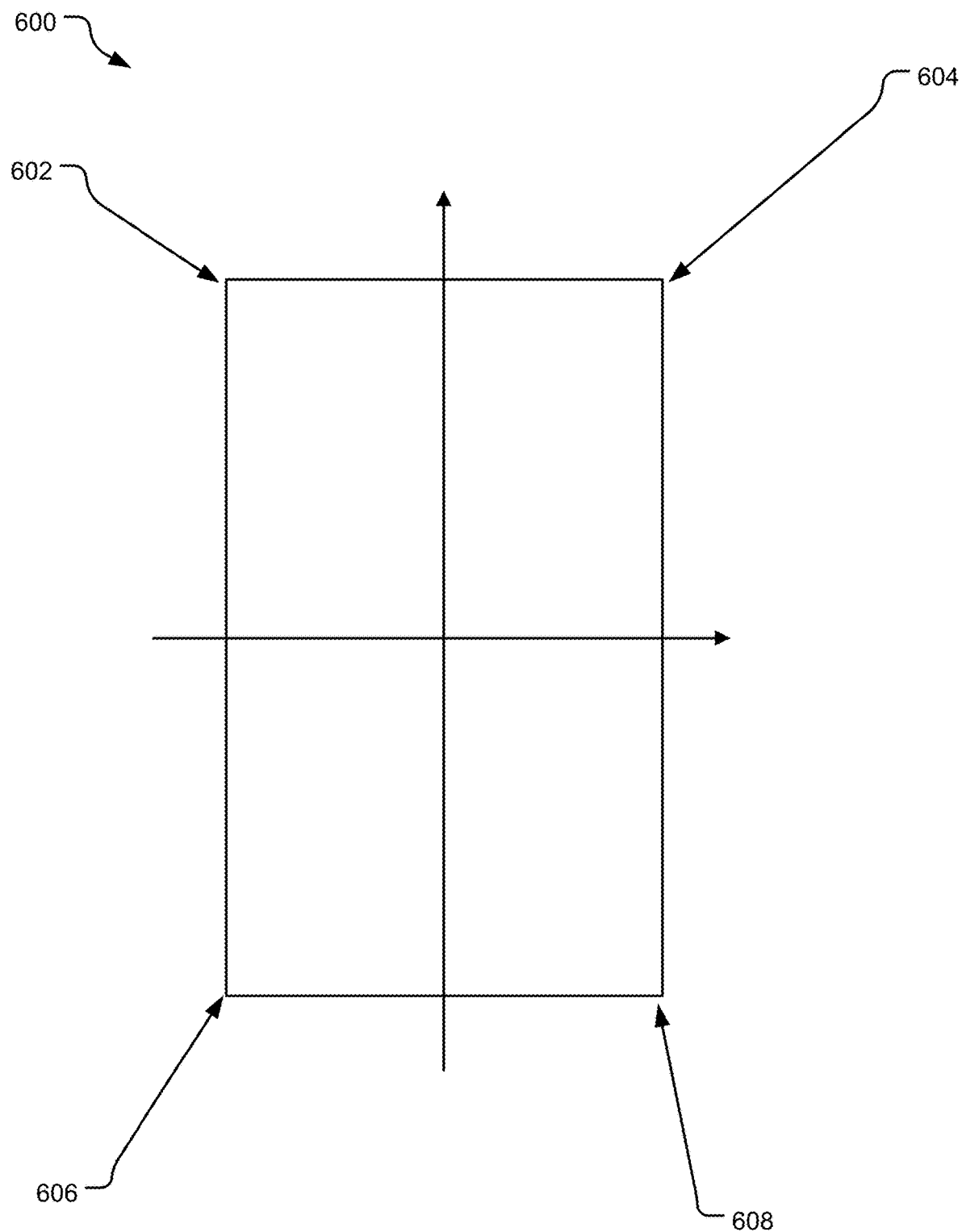
FIG. 6 illustrates an example illustration for calculating position of four vertices of a view rectangle.

(2) On the other hand, four vertices of an upright, non-rotated view rectangle VW 600, as illustrated in FIG. 6, may be defined by:

$w=0.5\times$view width, $h=0.5\times$view height.

(3) When the view rectangle VW 600 is rotated by theta, the four vertices move to:

Top left vertex 602: $(-w \cos \theta + h \sin \theta, -w \sin \theta - h \cos \theta)$, Top right vertex 604: $(w \cos \theta + h \sin \theta, w \sin \theta - h \cos \theta)$, Bottom left vertex 606: $(-w \cos \theta - h \sin \theta, -w \sin \theta + h \cos \theta)$, and Bottom right vertex 608: $(w \cos \theta - h \sin \theta, w \sin \theta + h \cos \theta)$.

(4) In order to fit the rotated view rectangle VW in the oval, an implementation scales VW by a and re-apply to (3).

$w'=0.5\alpha\times$view width, $h'=0.5\alpha\times$view height (5) By combining 1-4, the minimal scale a can be determined given VO, VW, the rotating angle $\theta$. For instance, if an implementation wants to make sure the top right vertex should stay within the oval, the equation is:

$$\frac{(0.5\alpha \times \text{view width} \times \cos\theta + 0.5\alpha \times \text{view height} \times \sin\theta)^2}{(0.5 \times \text{video width})^2} +$$

$$\frac{(0.5\alpha \times \text{view width} \times \sin\theta - 0.5\alpha \times \text{view height} \times \cos\theta)^2}{(0.5 \times \text{video height})^2} \leq 1$$

Figure 7:
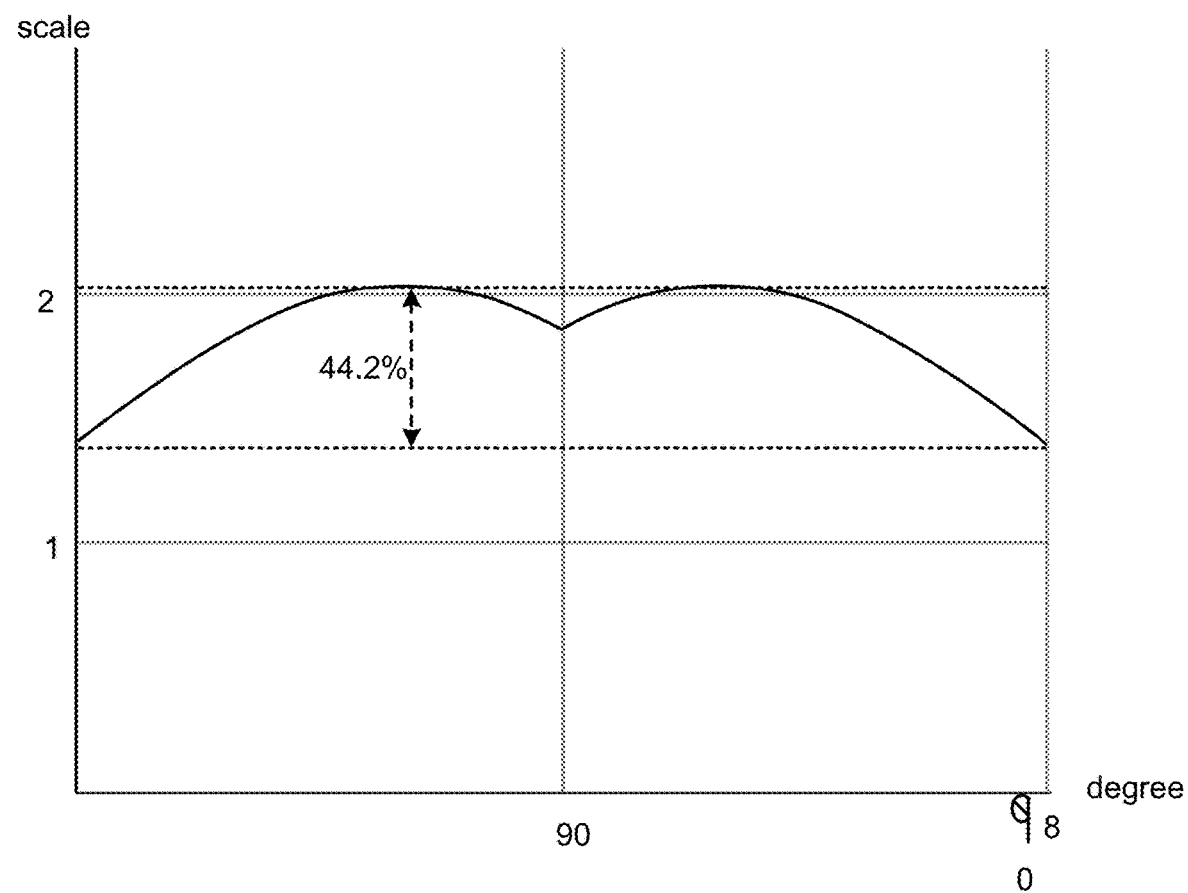
FIG. 7 illustrates an example graph of zoom factor as a function of degree of rotation of degree of rotation.

Oval Rotation Method: In an implementation of the video playback technology disclosed herein, the above described geometric framework of designing a rotatable video-viewing system is used. The oval gives an alternative mathematical lower bound for the system designer to determine the scaling factor. Based on the Oval Method, the Zoom Factor is largely reduced. For a typical widescreen portrait video and device of the scale (9:16), the suggested scale is 1.41× at portrait; maxed at 2.04× around 60 degree rotation, and is 1.86× at landscape. As a result, the Zoom Factor is reduced from 77.8% to 44.2%, as illustrated by a graph 700 in FIG. 7. As a result, the user is less likely to feel uncomfortable in viewing the scaled video.

Figure 8:
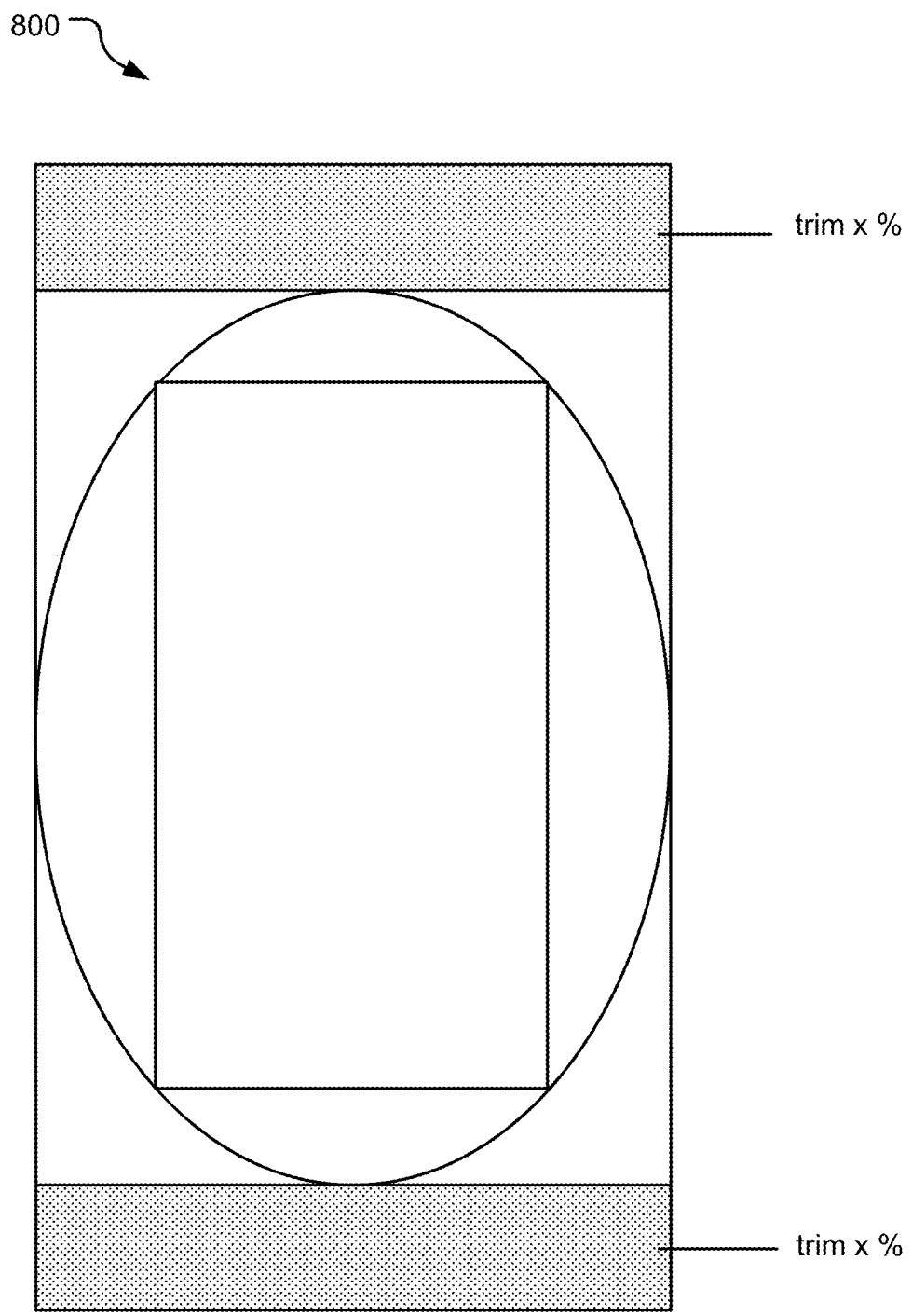
FIG. 8 illustrates example trimming of a wide side of a video according to an implementation disclosed herein.

Given the mathematical lower bound of the scaling factor, an implementation disclosed herein uses an alternative scaling curve as long as it stays in bound. Other enhancements include but are not limited to:

Trimming the wide side of the video 800 by × percent, as illustrated by FIG. 8.

Figure 9:
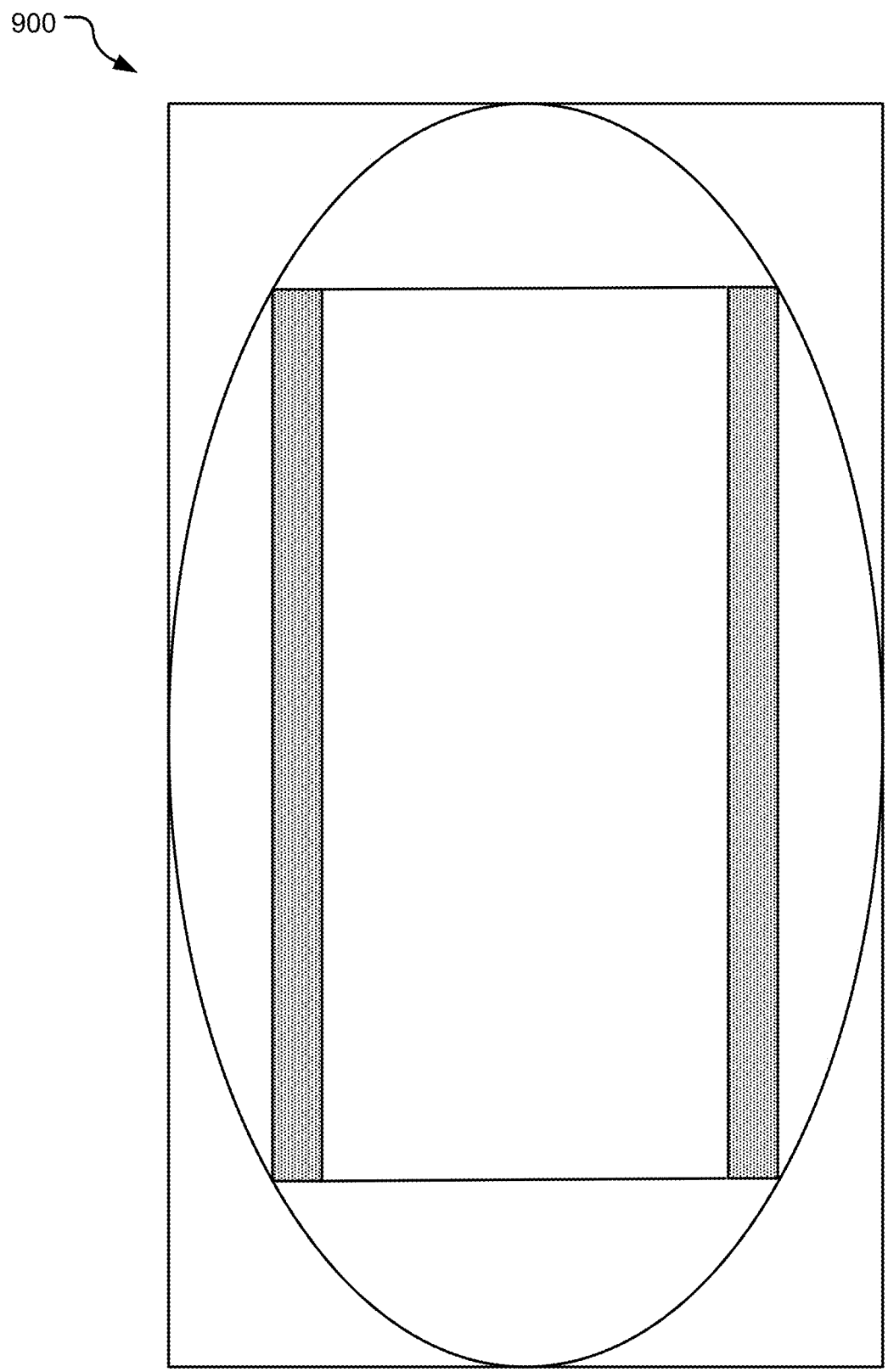
FIG. 9 illustrates example pre-zooming and maintaining at a fixed scale with view around portrait orientation according to an implementation disclosed herein.

Pre-zooming and maintaining at a pre-determined fixed scale with view around portrait orientation 900, as illustrated in FIG. 9.

Figure 10:
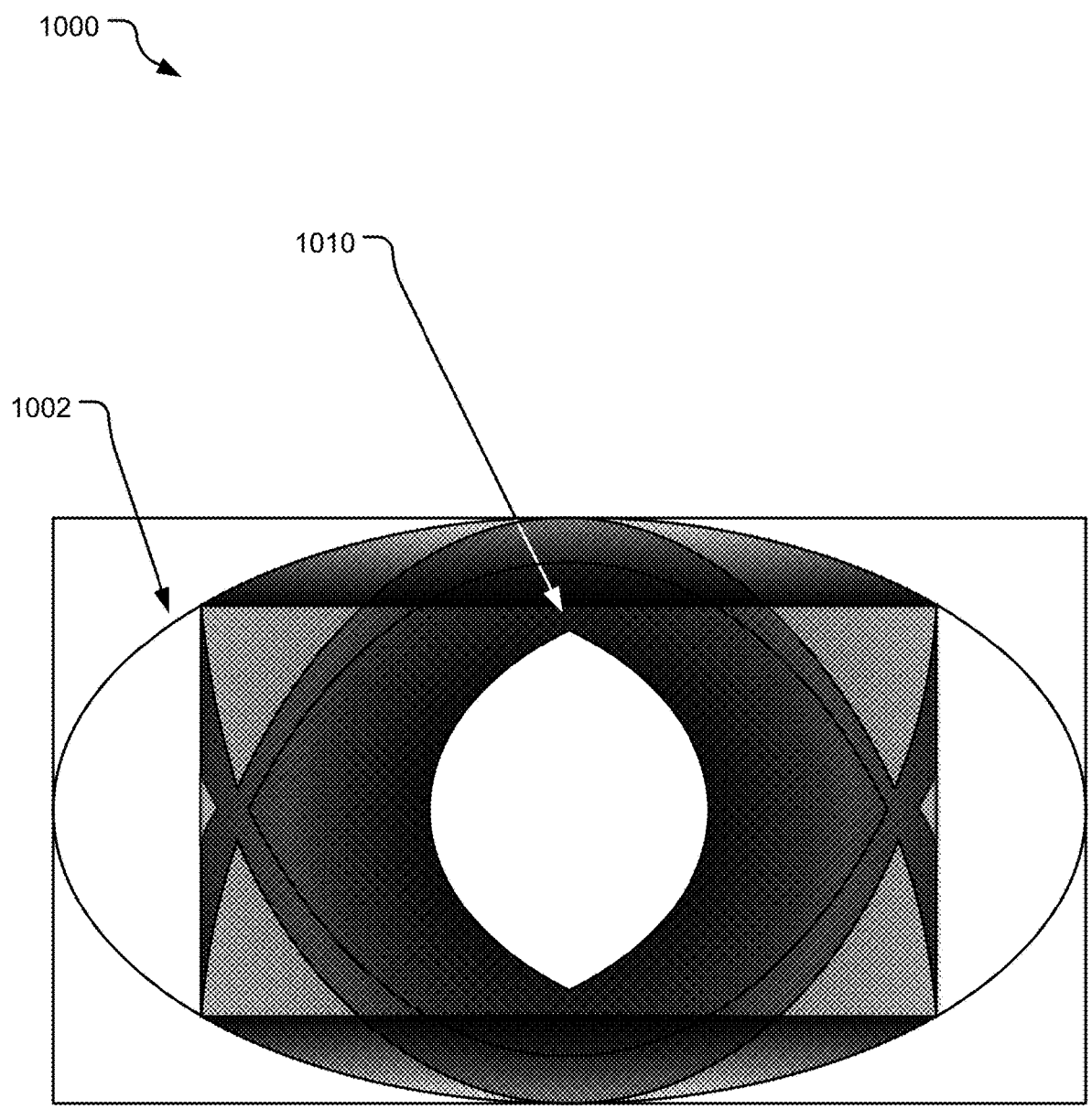
FIG. 10 illustrates example overlaying of rotated view angles according to an implementation disclosed herein.

Alternatively, the system overlays the rotated view rectangles 1010 in an oval 1002 as illustrated in FIG. 10 to obtain a visible video mask 1000. The mask 1000 may be used as a visual hint for users who record videos, and/or for video compression purpose. For example, the visible video mask 1000 may be communicated to a user so that the user can view a boundary of the visible video mask 1000 when recording a video. For example, the visible video mask 1000 may be overlaid on device screen when a user is recording a video.

Figure 11:
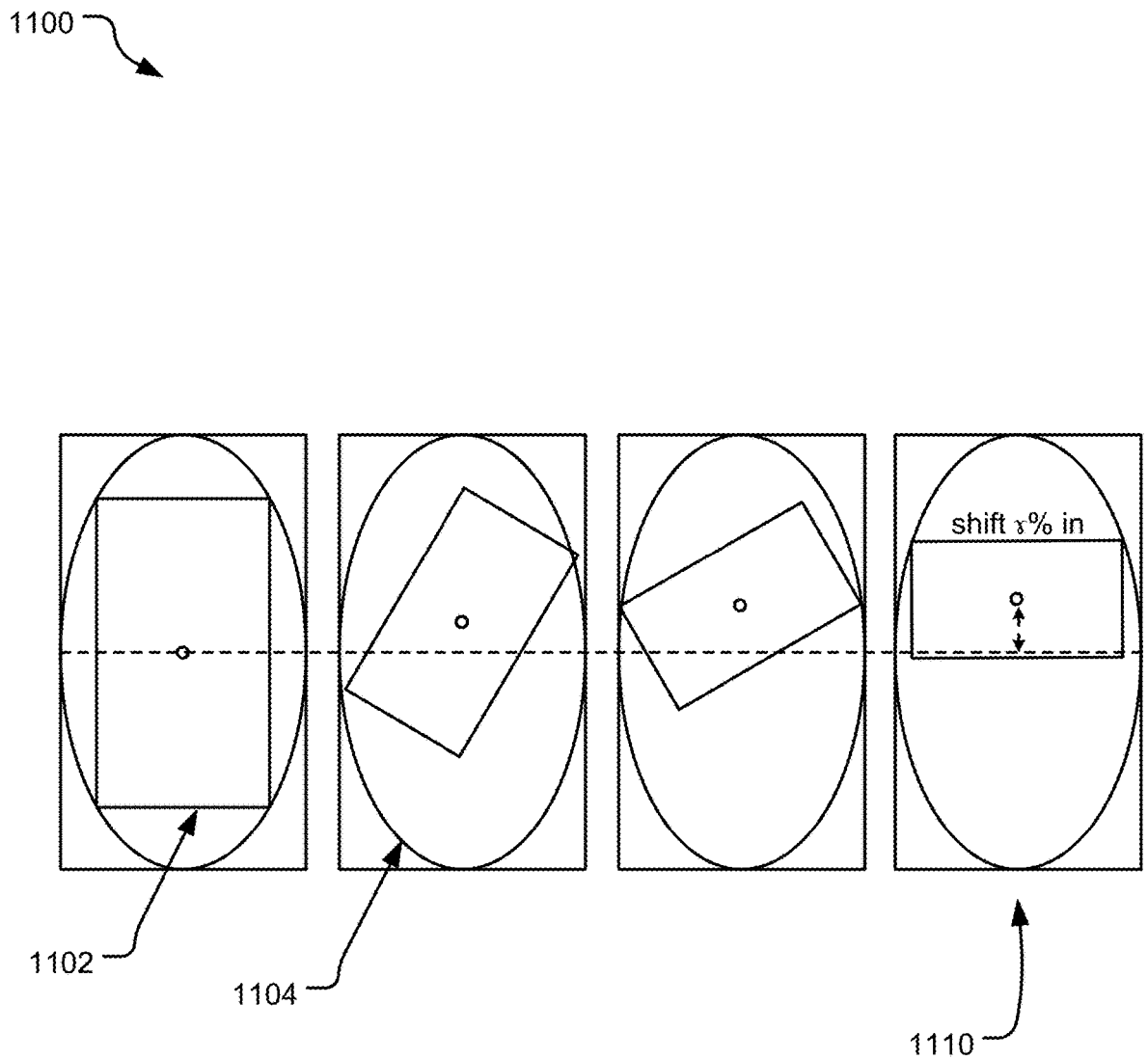
FIG. 11 illustrates example rotation of a video off a center of an oval.

Yet alternatively, the system rotates the video 1102 off a center of an oval 1104 as disclosed by 1100 in FIG. 11. For instance, the viewport can be centered at portrait, while shifting upward or downward at landscape as illustrated at 1110. The technique is particularly useful to capture the highlight of the video.

In another implementation, to support off-center rotation, a "Highlight Anchor" can be positioned on the video. In one implementation, the video playback technology disclosed herein allows a user to set the anchor. In another implementation, the video playback technology disclosed herein sets the anchor automatically (by a computer-vision enabled system).

Figure 12:
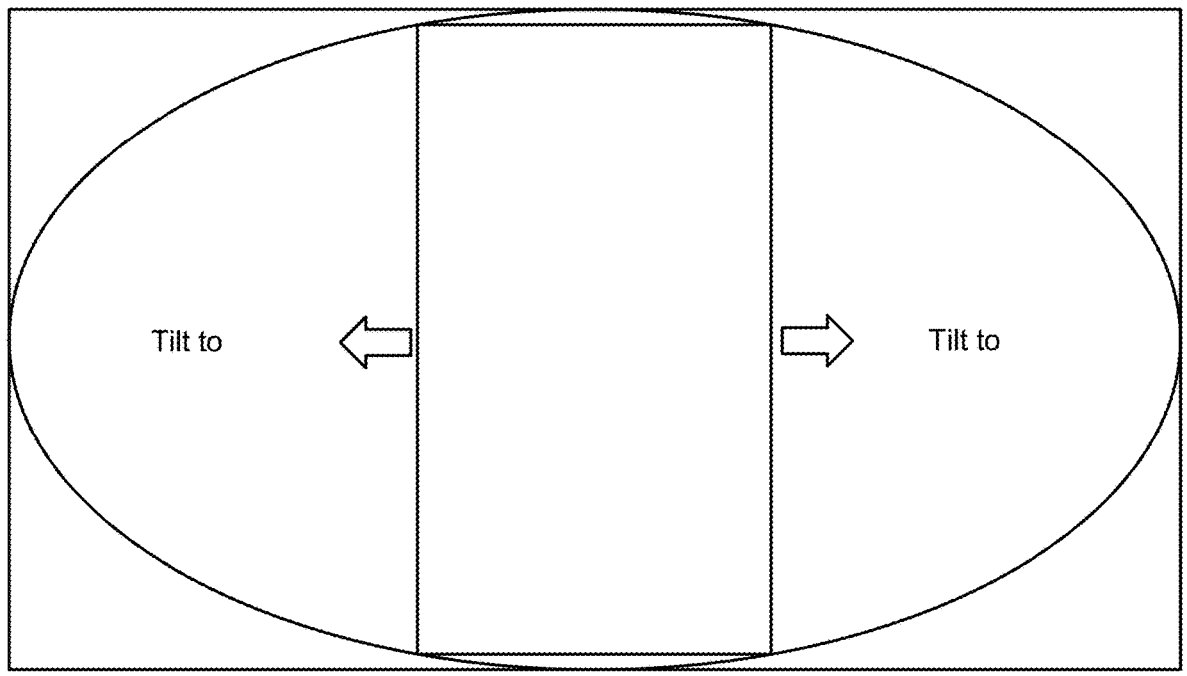
FIG. 12 illustrates example movement of viewport that allows a user to tilt or move the viewing device.

As the viewport is scaled up (zoom in) for viewing the video in order to support rotation, viewable margins can exist in one or multiple directions. Therefore, in one implementation, the system allows the user to tilt or move the viewing device to the left, right, up, and down. In such implementation, the system moves the viewport accordingly as illustrated by 1200 in FIG. 12. Here "tilt" is defined as relative motion, whereas "move" is defined as absolute motion. In another implementation, the rotation, movement, and tilting is allowed only after a time set by the video creators.

The video display technology disclosed herein creates a unique video viewing experience in which the user can not view the entire video in one angle. As a result, the user is motivated to engage in the experience by chasing a moving subject in the video. In one implementation, as only a partial view is visible in the initial view angle, the user is motivated to rotate the viewing device in order to reveal the whole scene within the video.

Furthermore, the video display technology disclosed herein realizes a unique storytelling experience for a video creator, who can compose the space and time of the video in various ways of engaging the viewers to interact with the video. The engaging viewing experience also represents a massive opportunities for a more effective mobile video advertising.

Video Sharing

Figure 13:
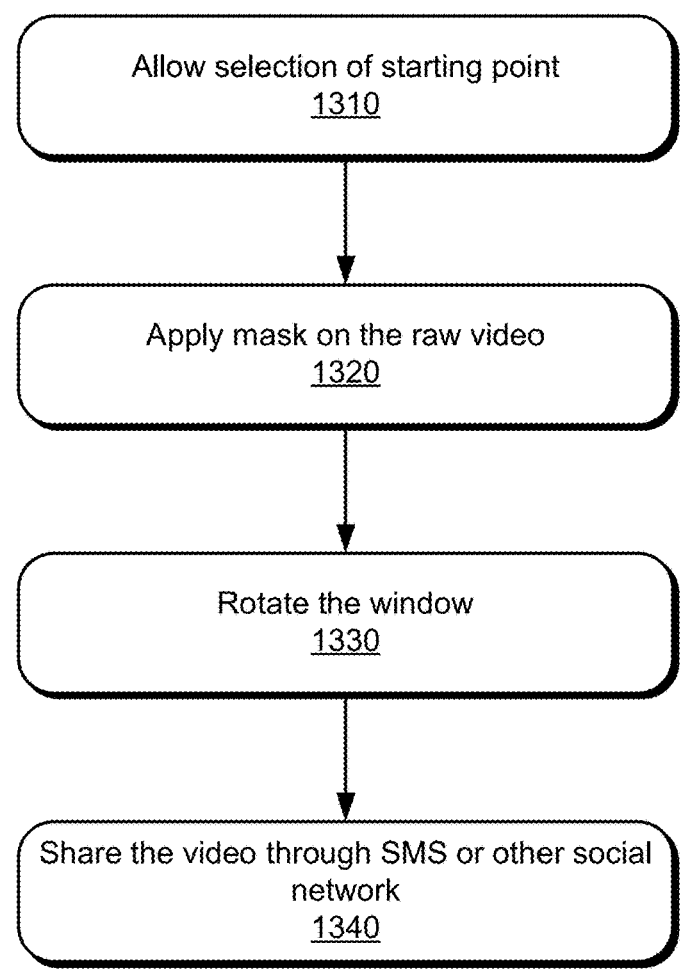
FIG. 13 illustrates example operations of a system for providing immersive video experience in a manner disclosed herein.

While the rotating video browsing experience relies on the core algorithm within the specific software, in order for people using a general video browsing software to enjoy a partial experience, the technology disclosed herein provides a special version of the raw video, which can be shared to other people and other software universally. One or more operations 1300 for sharing the video are illustrated in FIG. 13. An operation 1310 allows announcing to one or more friends that want to share the video experience (sharer) to select where they want the rotation to start in the shared version of the video. An operation 1320 applies a mask on the raw video, with a rectangle-shaped window, so that the receiver can view just part of the video, as if they're using our special software to browse the video vertically. Subsequently, Depending on the user's selection in operation 1310, at ¼, or ⅔, or ¾ of the video timeline, an operation 1330 rotates the window in operation 1320 clockwise, as if the receiver can rotate the device and see a different parts of the video. Finally, an operation 1340 allows the sharer to send out the video through SMS or other social networks.

Avoiding Rotation When Device In On a Horizontal Surface

When the device is laid flat on the desk, the gravity's direction is perpendicular to the screen, and its projection on to the screen's X and Y axis is very small. Since the core algorithm relies on the X and Y axis readings as input, the input has a very low signal-to-noise ratio (SNR), and a small disturbance to the device MAY cause the video to rotate a lot, resulting is a bad user experience. To avoid this, an implementation disclosed herein avoids any operation if the X and Y axis readings are below predetermined thresholds X_THRESHOLD and Y_THRESHOLD. The pseudocode for such implementation is as given below:

```
if (gravity.x < X_THRESHOLD && gravity.y < Y_THRESHOLD) {
   return;
} else {
   performCoreAlgorithm( );
}
```

Smooth Out Rotation Using a Low-Pass Filter (LPF)

The core algorithm may react very swiftly to a device's altitude change against the gravity. When watched for a long time, user may feel it hyper-responsive and get motion-sick. An implementation disclosed herein reduces the motion sickness by avoiding responding to small turbulence in the altitude change. In such an implementation, whenever the software receives an update from the device's gravity sensor, it applies a low-pass filter (LPF), and uses the LPF output as the input to the core algorithm. The pseudocode for such implementation is as given below:

```
var lpfX = 0.0;
var lpfY = 0.0;
let kFilteringFactor = 0.1;
func onDeviceGravityUpdate(gravity) {
    let lpfX = (gravity.x * kFilteringFactor) +
    (lpfX * (1.0 - kFilteringFactor))
    let lpfY = (gravity.y * kFilteringFactor) +
    (lpfY * (1.0 - kFilteringFactor))
}
```

Figure 14:
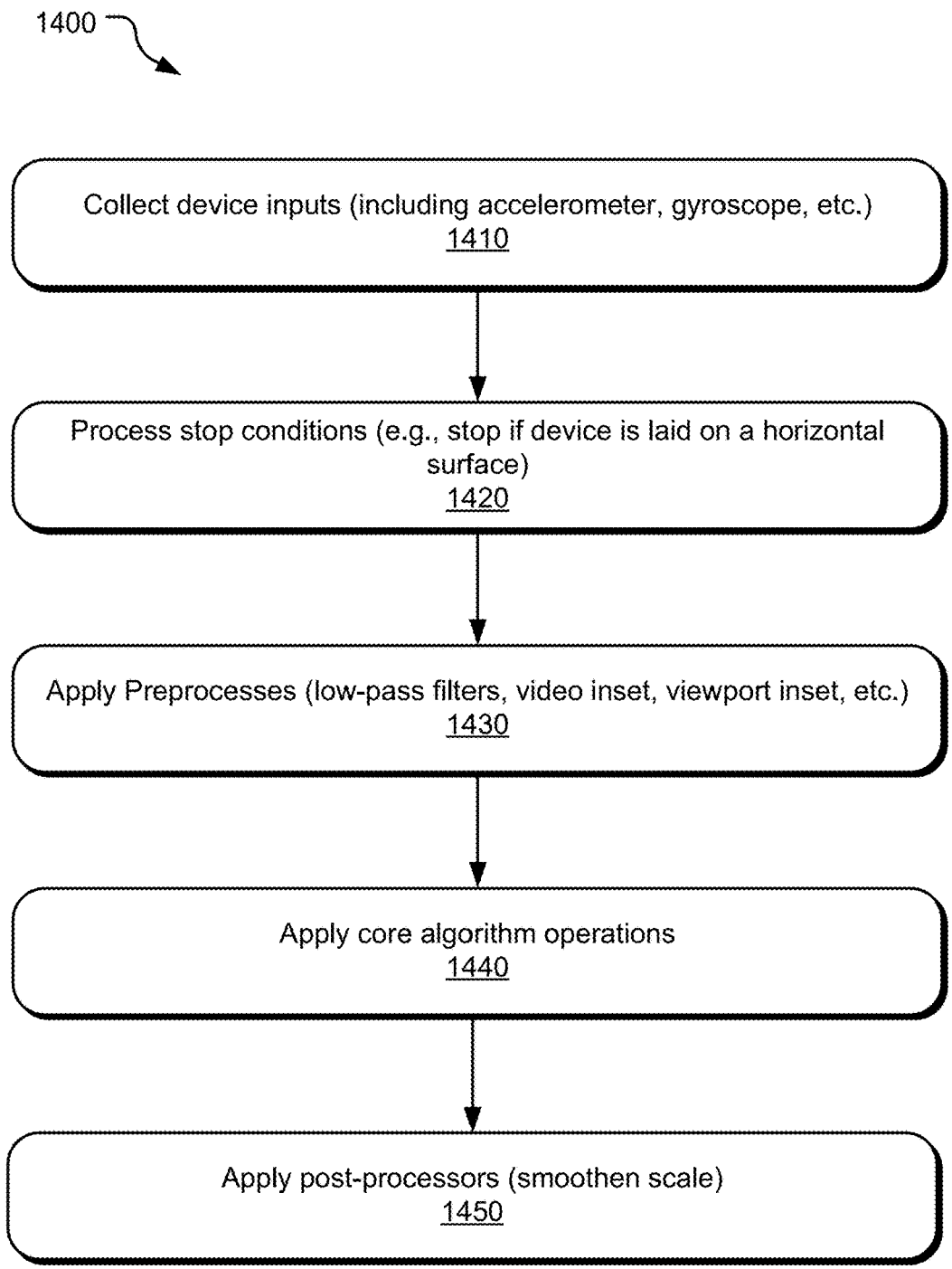
FIG. 14 illustrates alternative example operations of a system for providing immersive video experience in a manner disclosed herein.

FIG. 14 illustrates example operations 1400 providing an overview of the video playback system disclosed herein. An operation 1410 collects various device inputs. An operation 1420 processes one or more stop conditions if the device is laid on a horizontal surface. An operation 1430 applied one or more pre-processes including a low-pass filter, a video inset, a viewport inset, etc. An operation 1440 applies various core algorithm operations discussed herein. Subsequently, an operation 1450 applies one or more post-processing operations to smoothen the scale of video playback.

Figure 15:
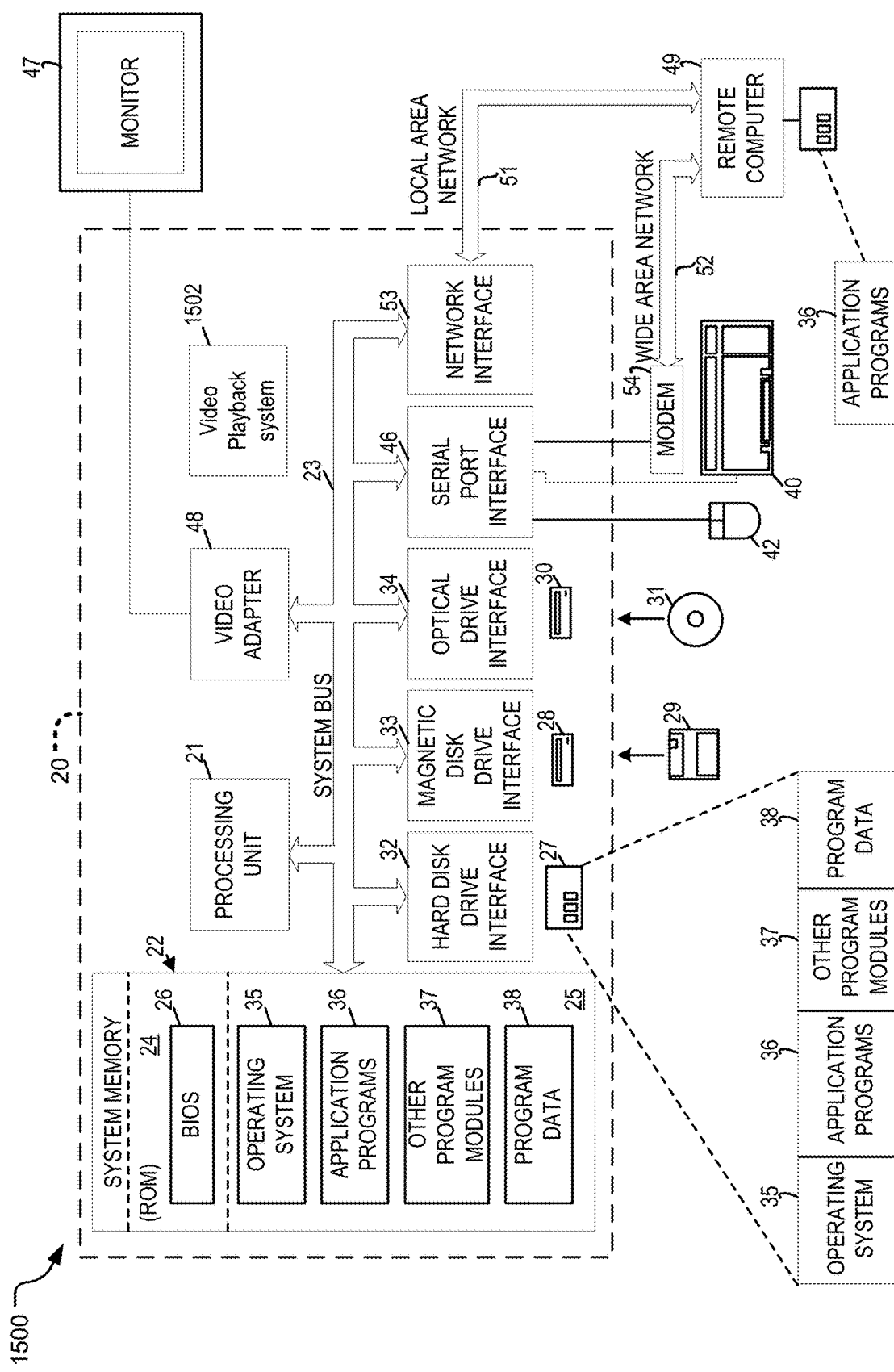
FIG. 15 illustrates example computing system that may be used to implement the system disclosed herein.

FIG. 15 illustrates an example system that may be useful in implementing the described predictive analytics technology. The example hardware and operating environment of FIG. 15 for implementing the described technology includes a computing device, such as general purpose computing device in the form of a gaming console or computer 20, a mobile telephone, a personal data assistant (PDA), a set top box, or other type of computing device. In the implementation of FIG. 15, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment. One or more computer instructions for implementing the video playback system 902 as disclosed herein may be implemented in one of the memories of the computer 20.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 15. The logical connections depicted in FIG. 15 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions and data for providing a search management system, various applications, search context pipelines, search services, service, a local file index, a local or remote application content index, a provider API, a contextual application launcher, and other instructions and data may be stored in memory 22 and/or storage devices 29 or 31 and processed by the processing unit 21.

Figure 16:
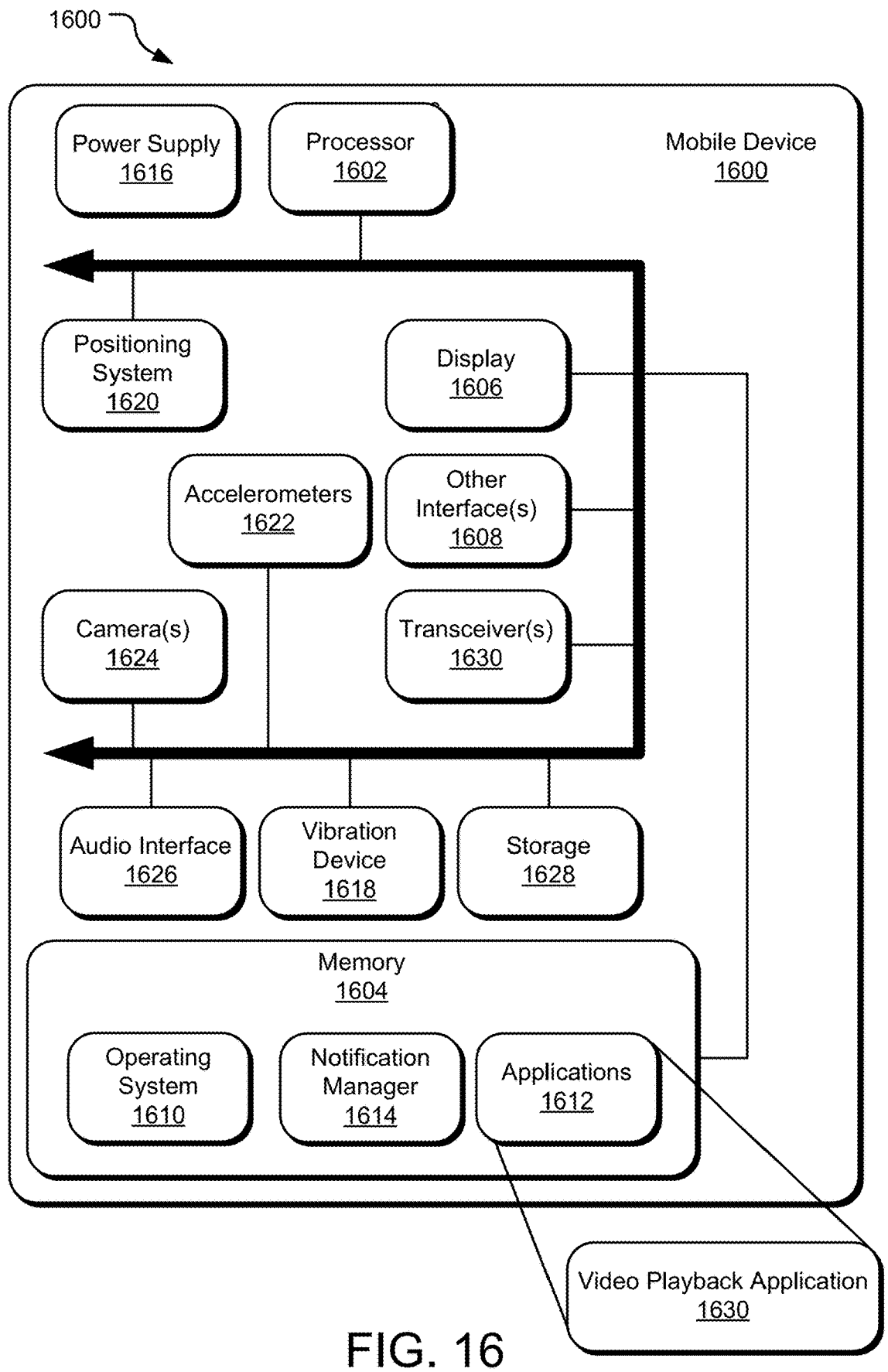
FIG. 16 illustrates example mobile device that may be used to implement the system disclosed herein.

FIG. 16 illustrates another example system (labeled as a mobile device 1600) that may be useful in implementing the described technology. The mobile device 1600 includes a processor 1602, a memory 1604, a display 1606 (e.g., a touchscreen display), and other interfaces 1608 (e.g., a keyboard). The memory 1604 generally includes both volatile memory (e.g., RAM) and non-volatile memory (e.g., flash memory). An operating system 1610, such as the Microsoft Windows® Phone operating system, resides in the memory 1604 and is executed by the processor 1602, although it should be understood that other operating systems may be employed.

One or more application programs module 1612 are loaded in the memory 1604 and executed on the operating system 1610 by the processor 1602. Examples of applications 1612 include without limitation email programs, scheduling programs, personal information managers, Internet browsing programs, multimedia player applications, etc. In one implementation, an immersive video playback application 1630 may be implemented on the application programs module 1612. A notification manager 1614 is also loaded in the memory 1604 and is executed by the processor 1602 to present notifications to the user. For example, when a promotion is triggered and presented to the shopper, the notification manager 1614 can cause the mobile device 1600 to beep or vibrate (via the vibration device 1618) and display the promotion on the display 1606.

The mobile device 1600 includes a power supply 1616, which is powered by one or more batteries or other power sources and which provides power to other components of the mobile device 1600. The power supply 1616 may also be connected to an external power source that overrides or recharges the built-in batteries or other power sources.

The mobile device 1600 includes one or more communication transceivers 1630 to provide network connectivity (e.g., mobile phone network, Wi-Fi®, BlueTooth®, etc.). The mobile device 1600 also includes various other components, such as a positioning system 1620 (e.g., a global positioning satellite transceiver), one or more accelerometers 1622, one or more cameras 1624, an audio interface 1626 (e.g., a microphone, an audio amplifier and speaker and/or audio jack), and additional storage 1628. Other configurations may also be employed.

In an example implementation, a mobile operating system, various applications, and other modules and services may be embodied by instructions stored in memory 1604 and/or storage devices 1628 and processed by the processing unit 1602. User preferences, service options, and other data may be stored in memory 1604 and/or storage devices 1628 as persistent datastores.

Figure 17:
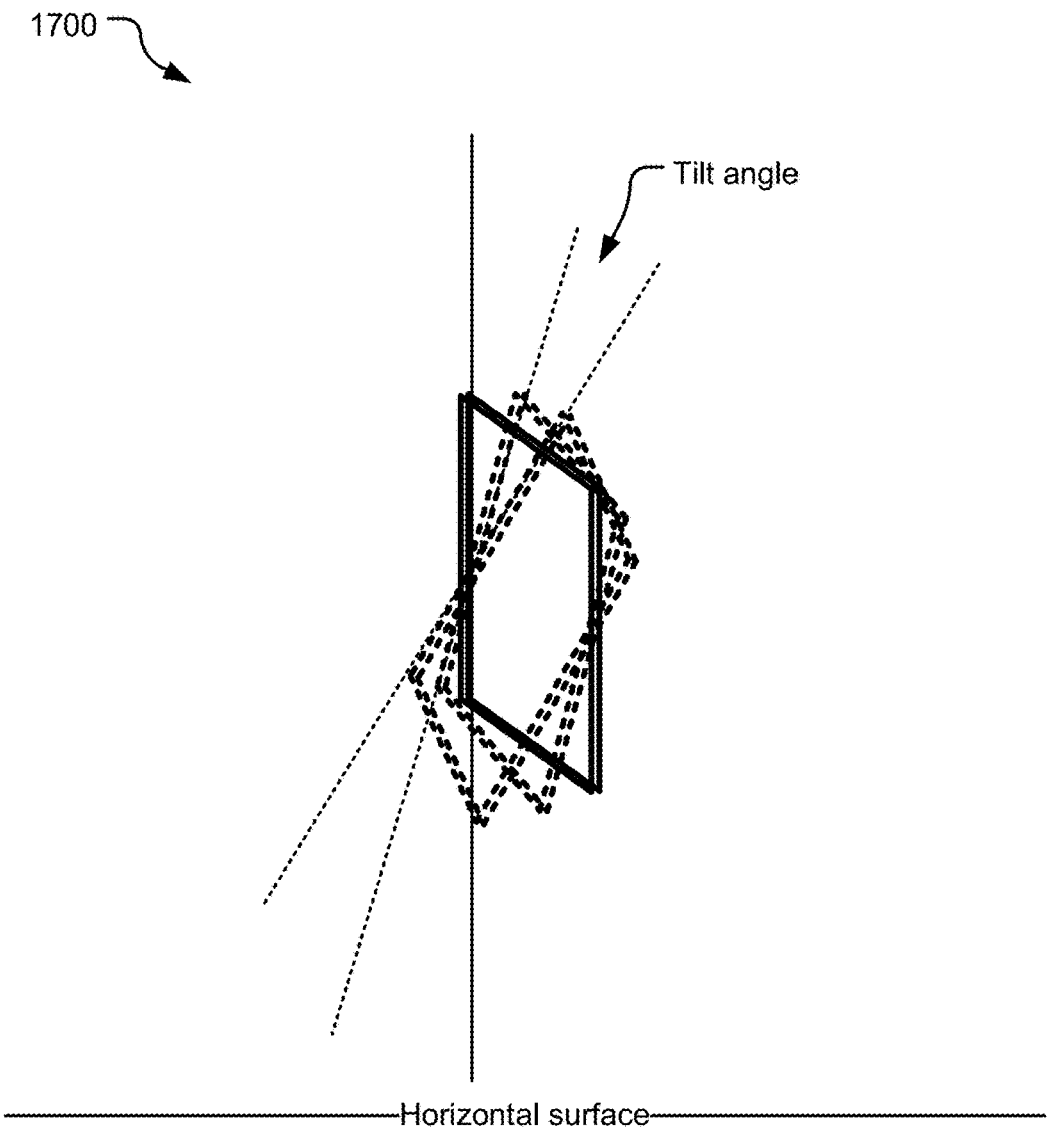
FIG. 17 illustrates example move of a display device.

FIG. 17 illustrates example move 1700 of a display device.

Figure 18:
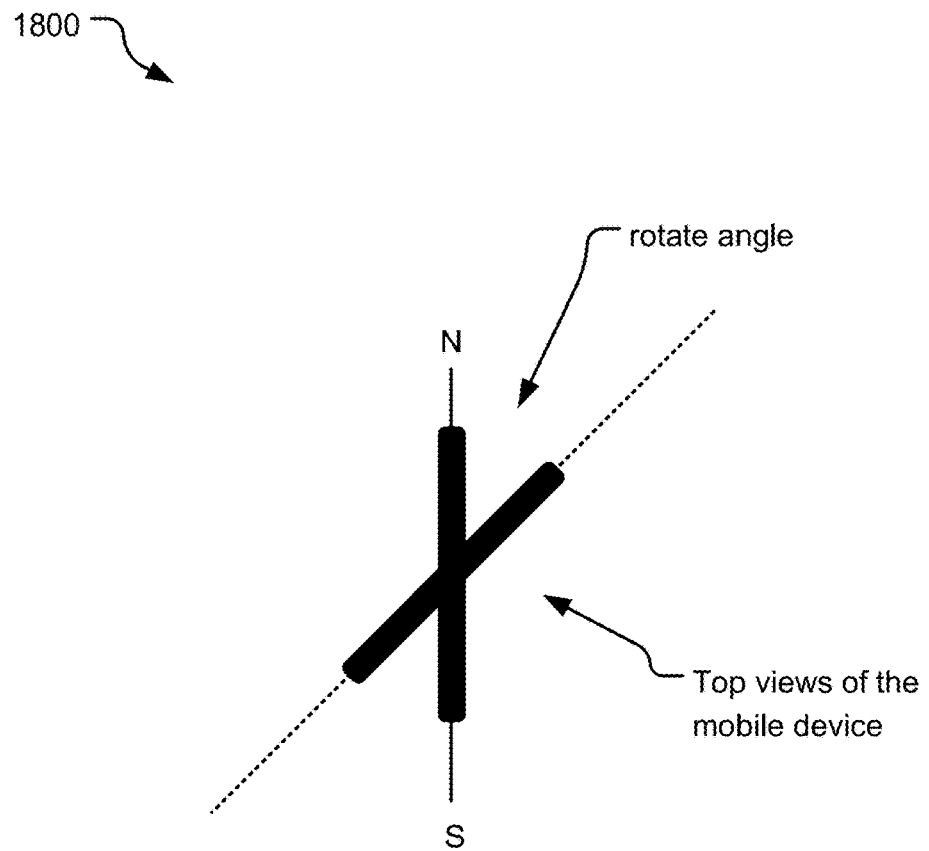
FIG. 18 illustrates example rotation of a display device.

FIG. 18 illustrates example rotation 1800 of a display device.

Figure 19:
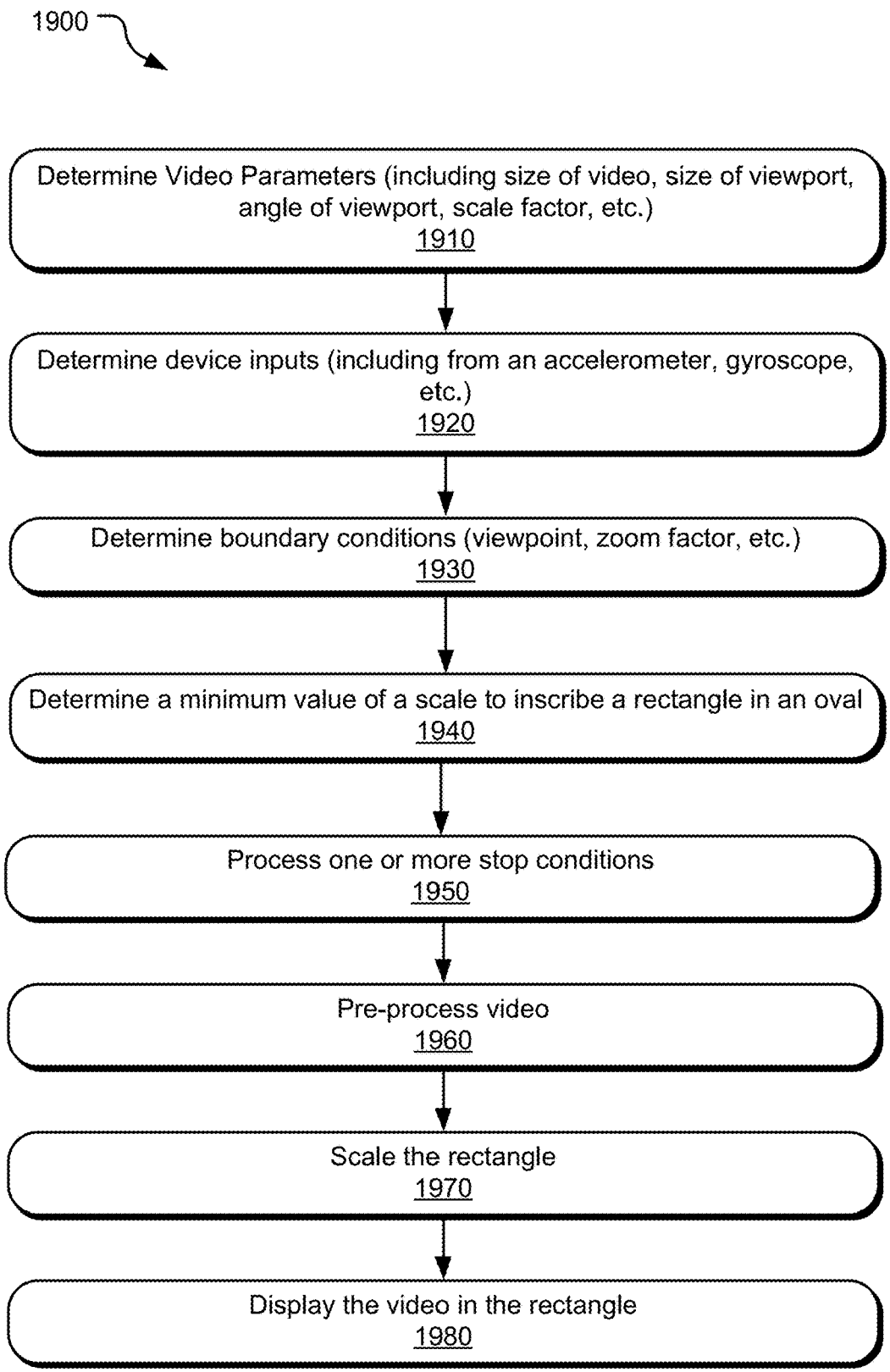
FIG. 19 illustrates example operations of a system for providing immersive video experience in a manner disclosed herein.

FIG. 19 illustrates example operations of a system for providing immersive video experience in a manner disclosed herein.

An operation 1910 determines various parameters of a video, including a size of the video, a size of a viewport used to display the video, an angle of the viewport, a scale factor, etc.

An operation 1920 determines various device inputs, such as an input from an accelerometer, an input from a gyroscope, etc. An operation 1930 determines one or more boundary conditions, such as viewpoint of the user, a zoom factor, etc. An operation 1940 determines a minimum value of a scale to inscribe a rectangle in an oval. An operation 1950 processes one or more stop conditions disclosed herein. For example, one stop condition may be that if the device displaying the video is put on a substantially horizontal surface as indicated by a device input, the processing of the video as disclosed herein is stopped.

An operation 1960 pro-processes the view according to one or more pre-processing methods disclosed herein. An example pre-processor may be processing the video using a low-pass filter. Another pre-processing operation may include one of a video inset and/or a viewport inset before a core algorithm disclosed herein is applied. An operation 1970 smoothens the scale of the rectangle according to one or more scaling methods disclosed herein.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

Embodiments of the present technology are disclosed herein in the context of an electronic market system. In the above description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features.

In the interest of clarity, not all of the routine functions of the implementations described herein are shown and described. It will, of course, be appreciated that in the development of any such actual implementation, numerous implementation-specific decisions must be made in order to achieve the developer's specific goals, such as compliance with application—and business-related constraints, and that those specific goals will vary from one implementation to another and from one developer to another.

According to one embodiment of the present invention, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present technology, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for providing video playback on a device, the method comprising:
   determining various parameters of the video including size of the video, the size of a viewport, a rotating angle of the viewport, and a scale factor;

determining various inputs from the device, including inputs from an accelerometer and a gyroscope;

determining one or more boundary conditions including viewpoint and zoom factor;

determining a minimum value of a scale to inscribe a rectangle in an oval based on one or more of the parameters of the video and the inputs from the device wherein the oval is defined by the height h and width w of the video and wherein the rectangle is defined by the width and height of the device viewing area; and rendering a rectangular portion of the video on the viewport such that vertices of the rectangular portion are on or inside a boundary of the oval.

2. The method of claim 1, further comprising determining if the device is substantially horizontal and processing various stop conditions in response to determining that the device is substantially horizontal.

3. The method of claim 1, further comprising pre-processing a gravity sensor input using a low-pass filter before using it to determine the minimum value of the scale to inscribe a rectangle in an oval.

4. The method of claim 1, further comprising pre-processing the video using at least one of a video inset and a viewport inset.

5. The method of claim 1, further comprising scaling the rectangle by $\alpha$ wherein the $\alpha$ can be determined by:

$$\frac{(0.5\alpha \times \text{view width} \times \cos\theta + 0.5\alpha \times \text{view height} \times \sin\theta)9}{(0.5 \times \text{video width})9} + \frac{(0.5\alpha \times \text{view width} \times \sin\theta - 0.5\alpha \times \text{view height} \times \cos\theta)9}{(0.5 \times \text{video height})} \leq 1.$$

6. The method of claim 5, further comprising displaying the video in the rectangle.

7. The method of claim 1, further comprising trimming a wide side of the video by a predetermined percentages.

8. The method of claim 1, further comprising pre-zooming and maintaining the video at a predetermined fixed scale.

9. The method of claim 1, further comprising generating a visible video mask by rotating the rectangle.

10. The method of claim 9, further comprising communicating the visible video mask to a user and overlaying the visible video mask on a video recording device screen.

11. A physical article of manufacture including one or more tangible computer-readable storage media, encoding computer-executable instructions for executing on a computer system a computer process, the computer process comprising:

determining various parameters of the video including size of the video, the size of a viewport, a rotating angle of the viewport, and a scale factor;

determining various inputs from the device, including inputs from an accelerometer and a gyroscope;

determining one or more boundary conditions including viewpoint and zoom factor;

determining a minimum value of a scale to inscribe a rectangle in an oval based on one or more of the parameters of the video and the inputs from the device wherein the oval is defined by the height h and width w of the video and wherein the rectangle is defined by the width and height of the device viewing area; and pre-processing a gravity sensor input using a low-pass filter before using it to determine the minimum value of the scale to inscribe a rectangle in an oval.

12. The physical article of manufacture of claim 11, wherein the computer process further comprising determining if the device is substantially horizontal and processing one or more stop conditions in response to determining that the device is substantially horizontal.

13. The physical article of manufacture of claim 11, wherein the computer process further comprising rendering a rectangular portion of the video on the viewport such that at least two vertices of the rectangular portion are on a boundary of the oval.

14. The physical article of manufacture of claim 11, wherein the computer process further comprising pre-processing the video using at least one of a video inset and a viewport inset.

15. The physical article of manufacture of claim 11, wherein the computer process further comprising scaling the rectangle by $\alpha$ wherein the $\alpha$ can be determined by:

$$\frac{(0.5\alpha \times \text{view width} \times \cos\theta + 0.5\alpha \times \text{view height} \times \sin\theta)9}{(0.5 \times \text{video width})9} + \frac{(0.5\alpha \times \text{view width} \times \sin\theta - 0.5\alpha \times \text{view height} \times \cos\theta)9}{(0.5 \times \text{video height})} \leq 1.$$

16. The physical article of manufacture of claim 15, wherein the computer process further comprising displaying the video in the rectangle.

17. The physical article of manufacture of claim 11, wherein the computer process further comprising trimming a wide side of the video by a predetermined percentages.

18. The physical article of manufacture of claim 11, wherein the computer process further comprising pre-zooming and maintaining the video at a predetermined fixed scale.

19. The physical article of manufacture of claim 11, wherein the computer process further comprising generating a visible video mask by rotating the rectangle.

20. A physical article of manufacture including one or more tangible computer-readable storage media, encoding computer-executable instructions for executing on a computer system a computer process, the computer process comprising:

determining various parameters of the video including size of the video, the size of a viewport, a rotating angle of the viewport, and a scale factor;

determining various inputs from the device, including inputs from an accelerometer and a gyroscope;

determining one or more boundary conditions including viewpoint and zoom factor;

determining a minimum value of a scale to inscribe a rectangle in an oval based on one or more of the parameters of the video and the inputs from the device wherein the oval is defined by the height h and width w of the video and wherein the rectangle is defined by the width and height of the device viewing area; and rendering a rectangular portion of the video on the viewport such that vertices of the rectangular portion are inside a boundary of the oval.

* * * * *